Aug. 10, 1954 F. S. MACKLEM 2,686,291

VARIABLE RELUCTANCE CONTROL MEANS

Filed March 13, 1950

Inventor
F. SUTHERLAND MACKLEM

By Mitchell Bechert

Attorneys.

Patented Aug. 10, 1954

2,686,291

UNITED STATES PATENT OFFICE 2,686,291

VARIABLE RELUCTANCE CONTROL MEANS

F. Sutherland Macklem, Freeport, N. Y., assignor to Servo Corporation of America, New Hyde Park, N. Y., a corporation of New York Application March 13, 1950, Serial No. 149,235

8 Claims. (Cl. 323—50)

My invention relates to devices variously known as saturable reactors, transductors, and magnetic amplifiers for the control of A.-C. power, and is in the nature of an improvement over the circuits disclosed in my co-pending patent application, Serial No. 138,094, filed January 12, 1950.

In the prior art, control of A.-C. power has been accomplished by means of electronic amplifiers or magnetic amplifiers. Electronic amplifiers have the disadvantage that they require associated D.-C. power supplies which are relatively bulky and expensive to construct. Magnetic amplifiers have the disadvantage that they rely upon saturation of a ferromagnetic core material and therefore are inherently highly non-linear devices. In particular, they tend to deliver a highly distorted waveform to their load when excited with a sinusoidal input. In addition, the inherent non-linearity of magnetic amplifiers makes them extremely difficult to design for optimum performance. Furthermore, magnetic amplifiers introduce relatively long time delays which in some applications are very serious.

It is, accordingly, an object of the invention to provide an improved device of the character indicated.

It is another object to provide an improved means for controlling the power delivered to an opposed-phase load.

It is also an object to provide improved means for differentially resolving two independently variable signals.

It is a further object to provide an improved means for deriving from two input signals, one variable independently of the other, an output signal of phase and magnitude reflecting the instantaneous relative difference between the input signals.

It is a specific object to meet the above objects with an improved magnetic-amplifying means which may not depend upon magnetic saturation or any of the phenomena associated with saturation.

Figure 1:
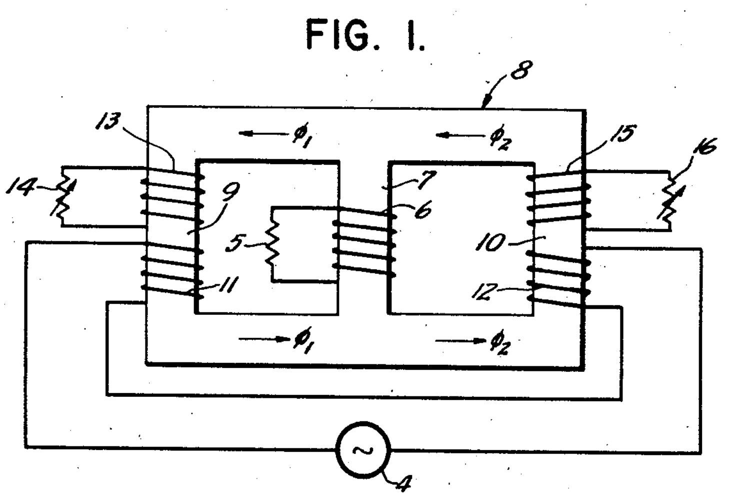
Figures 2, 3:
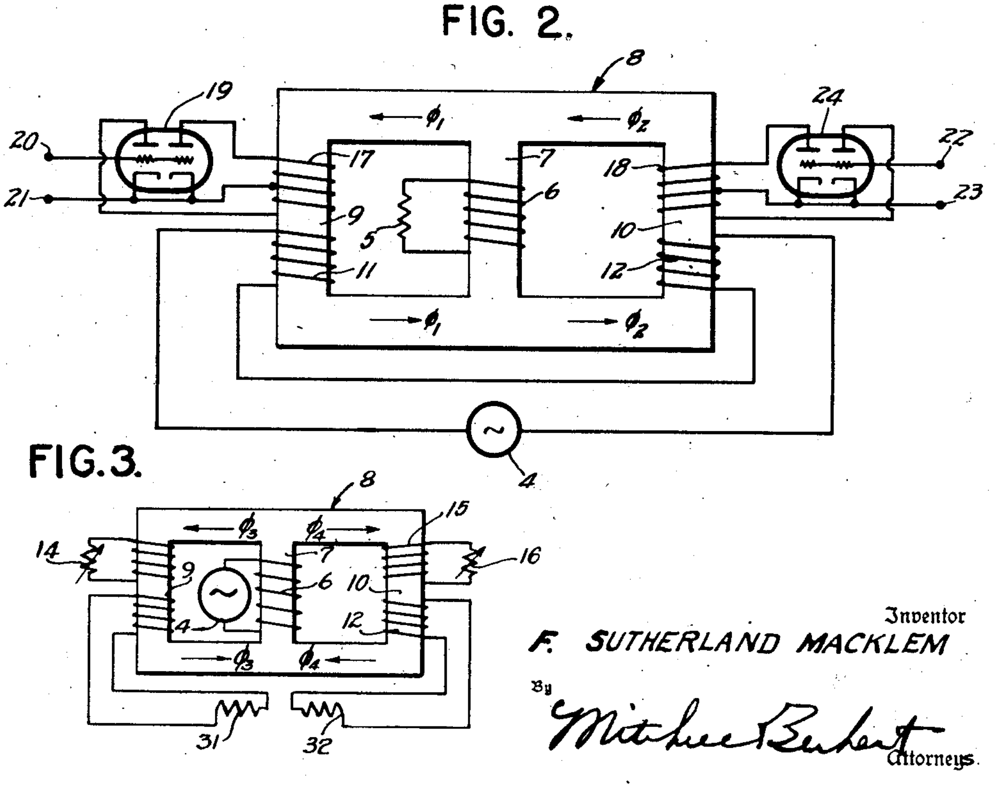

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a simplified circuit diagram showing a control device according to the invention; and Figs. 2 and 3 are further circuit diagrams showing applications of the principles of the invention to modified arrangements.

Briefly stated, my invention contemplates means for controlling A.-C. power transferred magnetically from a primary coil to a secondary coil by introducing a variable-reluctance in series with the magnetic path between the primary and the secondary. Although the primary and secondary windings may be interchanged as far as input and output signals may be concerned, in two forms to be described, the primary winding is coupled to two of three legs of a three-legged transformer core in such a way that fluxes are generated in both these legs in the same direction. If these fluxes are of the same magnitude, and if the secondary is connected to a load and is coupled to the third leg, then the flux will travel only in the loop which includes the two primary legs. If, however, the flux in one of the primary legs is caused to vary, as by the introduction of a variable reluctance in series with one of the primary legs, then the fluxes in the primary legs will be different; a flux equal to this difference will circulate through the secondary leg, and a transfer of power to the load may be effected. In the third arrangement, the fluxes are caused to flow in opposite directions.

Referring to the schematic arrangement of Fig. 1, I show my invention in application to a means for controlling the magnitude and phase of power delivered to an opposed-phase load 5, which may be part of a reversible motor to be driven in one direction at varying speeds, in accordance with varying amplitudes of voltage of one phase induced in a secondary coil 6; the motor 5 may be driven in the opposite direction at varying speeds in accordance with voltages of opposite phase induced in the secondary winding 6. The secondary winding 6 may be coupled to one leg 7 of a three-legged transformer core 8, and in the form shown the output or secondary leg 7 is the center leg of the core 8. The core 8 may include two other legs 9—10 which may both be energized by the same primary-winding means, but which, in the form shown, are separately energized by primary coils 11—12, respectively, connected to each other in series so that they may be energized by a common source 4 of A.-C. power.

The windings 11—12 are preferably so arranged with respect to each other that, when energized by the source 4, they may each set up fluxes in the same direction in their respective core legs, and I have schematically indicated that a flux $\phi_1$ is set up by the primary coil 11 in the left leg 9, while a flux $\phi_2$ of the same direction or polarity is set up by the primary coil 12 in the right leg 10. If the magnitudes of the fluxes $\phi_1$ and $\phi_2$ should be the same, then flux will tend to circulate through a loop defined by the primary legs 9—10 to the exclusion of the secondary or output leg 7 so that, under such circumstances, no power will be transferred to the load 5. If, however, the flux set up in one primary leg should be of a different magnitude than the flux set up in the other primary leg, then a flux equal to the difference between $\phi_1$ and $\phi_2$ will be caused to flow in the secondary or output leg 7, with the result that the load or motor 5 will be driven in accordance with the magnitude and sense or phase of this difference.

In accordance with a feature of the invention, control of the flux diverted to the secondary or output leg 7 may be achieved by introducing a variable reluctance in series with one of the primary paths of the legs 9—10. Thus, if the two primary coils 11—12 were of different size so as to induce different fluxes $\phi_1$—$\phi_2$ in their respective legs, and if a variable reluctance such as a coil 13 connected to a variable impedance 14 were coupled to one of the primary legs (9), then merely by varying the single control impedance (14) one might achieve a range of values of flux $\phi_1$ extending from $\phi_1$ less than $\phi_2$, to $\phi_1$ equal to $\phi_2$, to $\phi_1$ greater than $\phi_2$. However, in the form shown, I prefer that the impedance in the primary legs 9—10 shall be normally the same so that the fluxes $\phi_1$—$\phi_2$ normally set up by primary windings 11—12 may be the same; for control purposes, I prefer to employ a control or tertiary winding in series with each primary leg, and a winding 15 on the right leg 10 may be connected to a variable impedance 16 in the manner which has already been described for tertiary 13 on the left leg 9.

In operation, if the control impedance 14 equals the control impedance 16, then the reluctance through both primary legs will be the same, equal fluxes $\phi_1$—$\phi_2$ will be induced, and no power will be transferred to the load 5. However, if the control impedance 14 is made less than the control impedance 16, the flux $\phi_1$ will be less than the flux $\phi_2$, and the center or output leg 7 will carry a flux in the direction of the flux $\phi_2$ and of a magnitude representing the difference between the flux $\phi_1$ and the flux $\phi_2$. The load 5 will then be driven with a voltage proportional to this difference and in a direction or phase corresponding to the direction of flow of the flux $\phi_2$ through the center leg 7. Conversely, if the control impedance 16 is made less than the control impedance 14, the flux $\phi_2$ will be less than the flux $\phi_1$, and the differential flux then passing through the secondary leg 7 will effect a transfer of A.-C. power to the load 5 with a magnitude again proportional to the flux difference but of a direction corresponding to the direction of flow of flux $\phi_1$ through the center leg 7. Thus it is clear that A.-C. power supplied to the load 5 may be controlled in magnitude and reversed in phase so as to reflect instantaneous independent variation of the two control impedances 14—16.

In Fig. 2, I show a modified means for controlling the same type of differential magnetic amplifier which has been described in connection with Fig. 1. The circuit in Fig. 2 may in all respects resemble that in Fig. 1 except for the control means, and I have, therefore, employed the same numerical designation of circuit elements. In the control means of Fig. 2, the magnitude and polarity of power delivered to an opposed-phase load 5 may be controlled in accordance with the instantaneous difference of two steady or slowly varying independent electrical signals. Control is, however, effected basically in the same manner, and the variable impedance of a space-discharge device may be employed in the circuit of each of the tertiary coils 17—18.

If desired, a single space-discharge device may be connected to each tertiary coil, but in the form shown I achieve more effective control by utilization of twin space-discharge paths or devices in push-pull at each tertiary. Thus, in the case of the tertiary winding 17, two triodes, or a double-triode 19 as shown, may be arranged with both outputs or plates connected to opposite ends of the tertiary winding 17, while the input circuit including the grids and cathodes may be connected to terminals 20—21 for application of the control signal. If desired, the cathodes may also be connected to the midpoint of the tertiary winding 17, as shown. Similarly, control signals for the tertiary winding 18 may be applied between input terminals 22—23 for another double-triode 24 having plate circuits connected to opposite ends of the tertiary winding 18 and having cathodes connected to the midpoint of the winding 18.

It will be seen that the tubes 19—24 may act as variable impedances for their respective tertiary windings 17—18, all in accordance with the magnitude of control signals applied to the input terminals 20—21 and 22—23, respectively, and that the direction and magnitude of flux induced in the output leg 7 and, therefore, the polarity and amplitude of power delivered to the load 5 may be varied in accordance with the instantaneous difference in signals applied at the two control inputs 20—21 and 22—23.

Even if the polarity of both control signals at 20—21 and 22—23 should be the same, it will be understood that upon a predominance of the signal at 20—21 over the signal at 22—23, a motor load 5 may be driven in a first direction at a speed proportional to the difference in signal magnitudes; conversely, if the signal at 22—23 should predominate over the signal at 20—21, then the motor load 5 may be driven in the opposite direction at a speed proportional to the difference in signal magnitudes. As long as the input signals are equal to each other, even though they may be varying, the motor load 5 will not be energized.

It will be seen that I have described a relatively simple and compact amplifying means utilizing a controlled magnetic coupling. By operating the magnetic core material always below saturation, linear characteristics may be obtained, and the wave form delivered to the load may be undistorted when excited with a sinusoidal input. My control means may effect selected speed and direction for driving a motor in accordance with the instantaneous differential of two mechanical displacements, as may be involved in the setting of control impedances 14—16; or the same type motor may be similarly driven in accordance with the instantaneous differential between two electrical signals, as applied to the inputs 20—21 and 22—23. My control means is not characterized by long time delays, and audio-frequency responses are completely practical.

As indicated generally above, primary and secondary windings may be interchanged as far as input and output signals may be concerned. In the cases of the described circuits, this change may be effected upon connection of winding 6 to an A.-C. source, so that winding 6 is then utilized as a primary; windings 11—12 may then be utilized as secondaries, and the desired opposed-phase directional control may still be effected in accordance with the instantaneous difference in magnitude of impedances across the tertiary windings 13—15.

This type of "reversed" usage of the circuits of Figs. 1 and 2 is shown in Fig. 3, wherein the source 4 is connected to winding 6, and wherein windings 11—12 are connected to windings 31—32 of a suitable opposed-phase load, such as a split-winding motor to be reversibly driven in accordance with the prevailing signal induced at one of the windings 11—12. The only difference between operation according to Figs. 1 and 2 and operation according to Fig. 3 will be in the relative directions of flux in legs 9—10; in Fig. 3 fluxes $\phi_3$ and $\phi_4$ will be in opposite directions, as indicated, but it will be appreciated that the settings of control impedances 14—16 may have generally the same desired effect of governing the relative magnitudes of fluxes $\phi_3$—$\phi_4$ and, therefore, the relative magnitudes of output signals in the windings 31—32. In view of the above-indicated reversibility of function of my control arrangements, the terms "primary" and "secondary," as used herein and in the claims, will be understood merely to identify a winding or a pair of windings, and not necessarily to imply connection to an input or use as an output.

While I have described my invention in detail for the preferred forms shown, it will be understood that modifications may be made within the scope of the invention as defined in the appended claims.

I claim:

1. In a device of the character indicated, magnetic-core means providing two flux-loop paths, primary-winding means linked to both paths for circulating flux in both said paths, secondary-winding means differentially linked to both paths and disposed for connection to a load, there being equal numbers of secondary-winding turns coupled to both said paths, whereby said secondary-winding means may respond to energize the load in accordance with the instantaneous difference between fluxes in said paths, tertiary-winding means including separate like coils each independently linked to a different one of said paths, and separate impedances connected to each of said coils, one of said impedances being variable.

2. In a device of the character indicated, a three-legged transformer core, whereby there may be two flux loops common to each other in one of said legs, primary-winding means inductively coupled to said core in such manner as to set up fluxes in both said loops when excited by a source of alternating voltage, secondary-winding means inductively coupled to said core in a manner to respond differentially to fluxes in said loops, said secondary winding means being electrically independent of said primary-winding means, and control means including two tertiary windings, each inductively coupled to one of said loops to the exclusion of the other of said loops, separate impedances connected independently and directly across said tertiary windings, at least one of said impedances being variable.

3. A device according to claim 2, in which each said impedance includes two space-discharge circuits having outputs connected for push-pull operation across each of said tertiary windings.

4. A device according to claim 3, in which each said tertiary winding is center-tapped and connected to the common pole of the push-pull outputs of said space-discharge circuits.

5. A device according to claim 2, in which said primary-winding means is linked to both loops of said core independently of said common leg.

6. A device according to claim 2, in which said primary-winding means is linked to said core on said common leg.

7. A device according to claim 2, in which said secondary-winding means is linked to both loops of said core independently of said common leg.

8. A device according to claim 2, in which said secondary-winding means is linked to said core on said common leg.

References Cited in the file of this patent

UNITED STATES PATENTS

| Number | Name | Date |
|---|---|---|
| 1,902,466 | Ratkovsky | Mar. 21, 1933 |
| 2,440,984 | Summers | May 4, 1948 |
| 2,491,221 | Singh | Dec. 13, 1949 |